(12) United States Patent
Roman (10) Patent No.: US 6,241,097 B1
(45) Date of Patent: Jun. 5, 2001

(54) BAG SPLITTER AND SEPARATION ASSEMBLY

(76) Inventor: Walter C. Roman, 475 Thackeray Ave., Worthington, OH (US) 43085

( * ) Notice: Subject to any disclaimer, the term of this patent is extended or adjusted under 35 U.S.C. 154(b) by 95 days.

(21) Appl. No.: 08/915,355

(22) Filed: Aug. 20, 1997

(51) Int. Cl.[7] .............................. B07B 1/04; B65B 69/00
(52) U.S. Cl. .............................. 209/3; 209/352; 209/682; 209/911; 209/930; 414/412; 83/425.3
(58) Field of Search ................................. 209/3, 352, 680, 209/682, 930, 911; 414/412; 83/909, 923, 946, 425.3; 241/79.1, 167, DIG. 38

(56) References Cited

U.S. PATENT DOCUMENTS

| | | | |
|---|---|---|---|
| 3,606,058 | * | 9/1971 | Davis ..................................... 414/412 |
| 4,216,865 | * | 8/1980 | Dudley .............................. 209/682 X |
| 5,267,823 | * | 12/1993 | Roman .............................. 209/930 X |
| 5,282,713 | * | 2/1994 | Lande ..................................... 414/412 |
| 5,339,961 | * | 8/1994 | Mayhak ..................................... 209/3 |

FOREIGN PATENT DOCUMENTS

| | | | |
|---|---|---|---|
| 2012814 | * | 9/1971 | (DE) ..................................... 414/412 |
| 1703562 | * | 1/1992 | (SU) ..................................... 414/412 |

* cited by examiner

Primary Examiner—Tuan N. Nguyen
(74) Attorney, Agent, or Firm—Mueller and Smith, LP (57) ABSTRACT

Disclosed is an assembly for splitting open contents-filled garbage bags selected from bags filled with yard waste and bags filled with cans and bottles. The assembly is composed of a flighted conveyor that conveys the filled garbage bags into a confined bag splitter assembly. The bag splitter assembly has sidewalls to confine filled garbage bags therein and has an overhead array of blade assemblies laterally spaced across the conveyor for confronting filled garbage bags conveyed by said conveyor into the bag splitter assembly. The blade assemblies are composed of a pivotally mounted blade holder disposed above the conveyor and carry horizontally-disposed canard-like blades having a forward point for confronting the filled garbage bags. The blades are disposed substantially continuously laterally across the width of the bag splitter assembly. For garbage bags filled with cans and bottles, the blades have a forward tip carry pointed elongate elements for puncturing the bags. A separation assembly for separating the split bags from their contents is located at the discharge end of the conveyor and is fitted with a first downward-sloping parallel bar assembly for permitting contents from the split bags to fall therethrough and for split bags to slide down said bar assembly and onto a rotating wheel array. The rotating wheel array has a rotating axle from which a plurality of spoked wheels are parallelly mounted, the outer circumference of the wheels bearing nibs for catching the split bags and urging their separation from the bags' contents.

24 Claims, 6 Drawing Sheets

BAG SPLITTER AND SEPARATION ASSEMBLY

CROSS-REFERENCE TO RELATED APPLICATIONS

This application is cross-referenced to applicant's commonly-assigned copending application Ser. No. 08/401,720, filed on Mar. 10, 1995, now U.S. Pat. No. 6,077,021 the disclosure of which is expressly incorporated herein by reference.

STATEMENT REGARDING FEDERALLY SPONSORED RESEARCH

Not applicable.

BACKGROUND OF THE INVENTION

The present invention relates to front-end separation of separate fractions of municipal solid waste (MSW) and more particularly, in one aspect, to an improved assembly for splitting open bags bearing MSW fractions such as, grass, leaves, yard waste, and the like; and, in another aspect, for splitting open bags bearing cans, bottles, and the like, e.g., so-called "blue bags". "Blue bags" refers to bags (the color blue relating to the bag color used in the original curbside recycling programs, though bags of any color can be used) that contain separated recyclables, e.g., paper, newsprint, plastics, aluminum cans, plastic bottles, or the like.

Solid waste materials of the type typified by MSW traditionally have presented problems of disposal. These disposal difficulties have become increasingly critical as populations have expanded and as the per capita production of solid waste has increased. In addition to using waste as a source of fuel or compost, industrial and home refuse or MSW typically comprises several components or fractions which are worth reclaiming. In particular, glass, ferrous and non-ferrous metals, plastic, and paper components are sufficiently valuable to justify their separation from composite MSW. Conventionally, such solid waste has been disposed of by incineration and/or landfill. With the present concern over problems associated with the protection of the environment and because of scarcity of landfill space and governmental regulations, both of these traditional techniques of disposal have become undesirable. Further, separation systems, to remain efficient, must be capable of having a reasonably high throughput rate for the material processed and since MSW varies from one area to the next, and between collections, the separation system also must be capable of handling materials which vary widely in nature and composition. To the present, the throughput rates of conventional systems have not been adequately high enough to derive efficiencies permitting the use of equipment in municipalities of small or medium size. However, because of the ever-increasing rigid requirements for carrying out waste treatment and because of the increasing scarcity of landfill space, some technique must be found to effectively increase such output rates.

To achieve the efficient separation of more valuable fractions of MSW and to derive an environmentally safe marketable compost or refuse derived fuel product, a waste treatment process should be carried out wherein raw MSW is passed through a variety of reduction, separation, and related treatment stages. These stages serve to remove inorganic components such as metals, glass, and plastics from the organic component of the MSW. The segregated or separated by-product materials, such as ferrous and non-ferrous metals, glass, and plastic, increasingly are becoming valuable resources worthy of the expenditure of capital for effective separation equipment. Of course, the quality and resultant value of the organic material also is dependent upon the corresponding quality of separation, the presence of plastics, glass, or other foreign particles being undesirable or unacceptable for most commercial applications.

A broad variety of separation techniques have been known to industry. Among those, both manual and automatic techniques have been used. The manual technique that generally involves human pickers usually is not cost effective nor desirable. The automatic techniques which rely on the fraction size for sorting by a grizzly or the magnetic characteristics of the magnetic fraction or the density of other fractions for air separation generally have not been employed by industry in such a manner as to eliminate the extensive need of human pickers to further separate MSW into the various fractions where air separation techniques have been applied to municipal waste separation. Designers have found that achieving high quality separation within reasonable cost limits proves to be an elusive goal. Since MSW varies widely in geographical, as well as daily, make-up and consistency, a uniform product is not available for separation treatment. Therefore, any separation system involving the sorting of solid waste must be capable of handling a wide variation of waste components.

An improved bag splitting assembly is disclosed in commonly-assigned U.S. Pat. No. 5,267,823. This assembly finds good use in the solid waste sorting system disclosed in commonly-assigned U.S. Pat. No. 5,101,977. A preferred conveyor system for use in both the bag splitting assembly and the solid waste sorting system is disclosed in commonly-assigned U.S. Pat. No. 5,219,064. The disclosure of these patents is expressly incorporated herein by reference.

In particular, most home owners and businesses bag their grass clippings, leaves, tree branches, bush clippings, flowers and flower stalks, vegetable refuse, and similar compostable yard waste (hereinafter, collectively "yard waste") in plastic bags and place such bagged yard waste for collection with their other refuse and garbage. The same is true in many communities where "curbside recycling" is practiced, i.e., separately bagging paper, newsprint, plastics, aluminum cans, etc. for recycling. Since such yard waste and some recyclables can be composted (as many home gardeners already practice) and/or other recyclables recycled for reuse, it would be beneficial to develop an automatic system that would free the yard waste, recyclables, and the like, from the plastic bags for processing of such yard waste. The same is true for the cans and bottles fraction that is segregated in separate plastic bags by curbside recycling efforts.

BRIEF SUMMARY OF THE INVENTION

Disclosed is an assembly for splitting open contents-filled garbage bags selected from bags filled with yard waste and bags filled with cans and bottles. The assembly is composed of a flighted conveyor that conveys the filled garbage bags into a confined bag splitter assembly. The bag splitter assembly has sidewalls to confine filled garbage bags therein and has an overhead array of blade assemblies laterally spaced across the conveyor for confronting filled garbage bags conveyed by said conveyor into the bag splitter assembly. The blade assemblies are composed of a pivotally mounted blade holder disposed above the conveyor and carry horizontally-disposed canard-like blades having a forward point for confronting the filled garbage bags. The blades are disposed substantially continuously laterally across the width of the bag splitter assembly. For garbage bags filled with cans and bottles, the blades have a forward tip carry pointed elongate elements for puncturing the bags.

A separation assembly for separating the split bags from their contents is located at the discharge end of the conveyor and is fitted with a first downward-sloping parallel bar assembly for permitting contents from the split bags to fall therethrough and for split bags to slide down said bar assembly and onto a rotating wheel array. The rotating wheel array has a rotating axle from which a plurality of spoked wheels are parallelly mounted, the outer circumference of the wheels bearing nibs for catching the split bags and urging their separation from the bags' contents.

The advantages and operating improvements in the handling of yard waste, e.g., for composting, will be readily apparent to those skilled in the art based on this disclosure. The same is true in the handling of cans and bottles, for example, for their recycle.

BRIEF DESCRIPTION OF THE DRAWINGS

The drawings will be described in detail below.

DETAILED DESCRIPTION OF THE INVENTION

Figure 1:
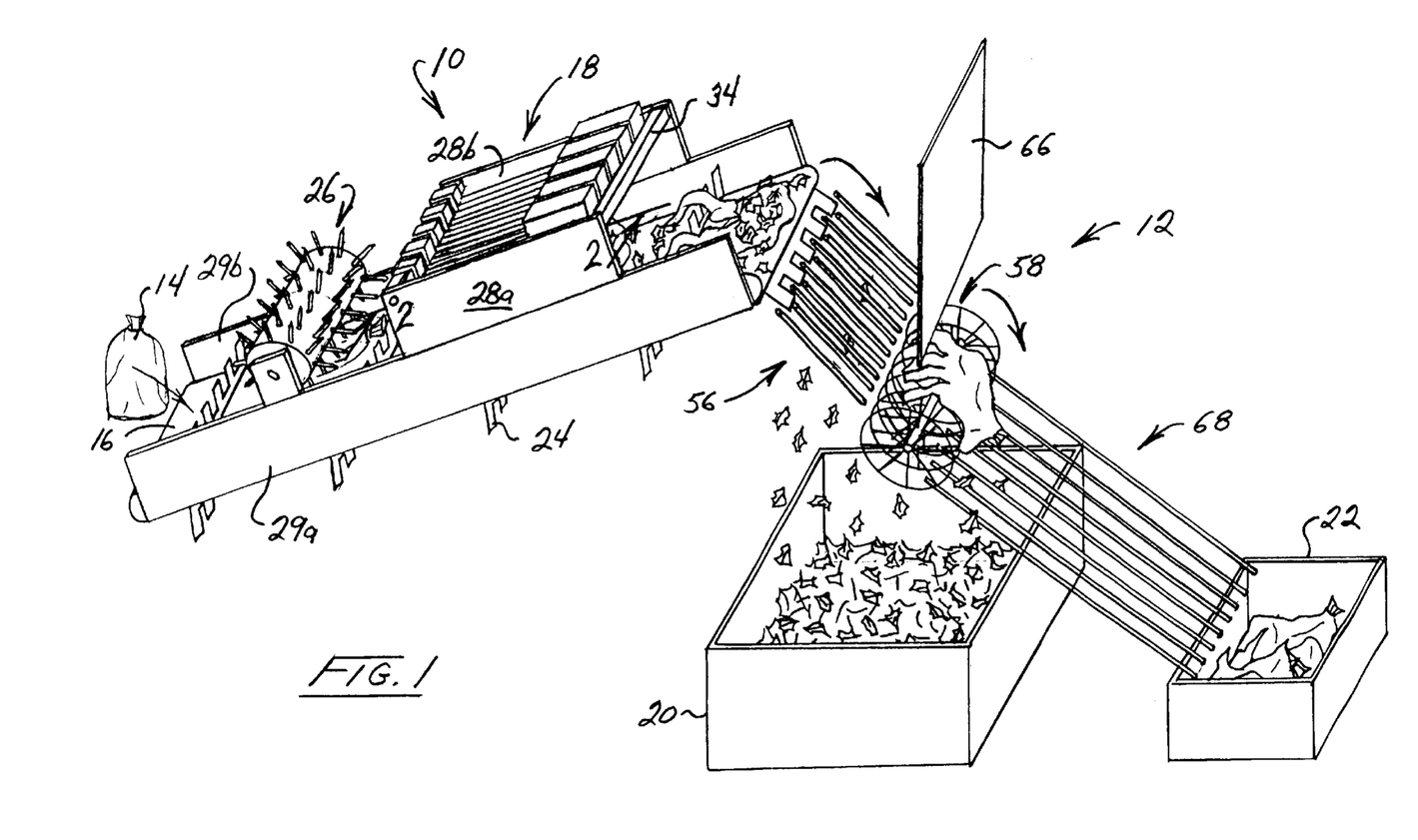
FIG. 1 is a perspective view of the bag splitting system, bag separation system, and collection system for handling bags filled with yard waste.

Looking to the novel bag splitting assembly and separation assembly for splitting open garbage bags containing yard waste and separating the split bags from their contents, reference is made to FIG. 1 wherein the bag splitter generally is identified by numeral 10 and the separation assembly generally is identified by numeral 12. The same general configuration can be used for bags filled with cans and bottles, though with a different blade assembly configuration which will be detailed below. FIGS. 1–4 will be described in connection with bags filled with "yard waste" (as defined above) while FIGS. 5 and 6 will illustrate the blade configuration assembly for the cans and bottles embodiment of the present invention. FIG. 7, then, illustrates the separation assembly which can be adapted for both embodiments of the present invention.

Referring to FIG. 1, the general process will be seen to involve the deposit of a contents-filled garbage bag (typical plastic garbage bag as most households employ), such as bag 14, onto conveyor 16 which conveys bag 14 through bag splitting zone 18. The split bag emerging from splitting zone 18 is treated by separation assembly 12 which provides for collection of the yard waste in container 20 and the empty split bags in container 22. More particularly referring to both FIGS. 1 and 2, it will be seen that typical filled garbage bag 14 is deposited onto flighted conveyor 16 that contains a plurality of notched flights, e.g., as typified by flight 24 (see FIG. 4), which is inclined slightly, say between 15° and 20°, in the direction of movement of conveyor 16 (the notches will be described below) in order to aid in keeping the filled bags from rolling over the flights as they are conveyed into splitting zone 18. Any air in bag 14 is expelled by use of rotating spiked drum 26, as described in more detail in commonly-assigned copending application Ser. No. 08/401, 720, cited above.

Figure 2:
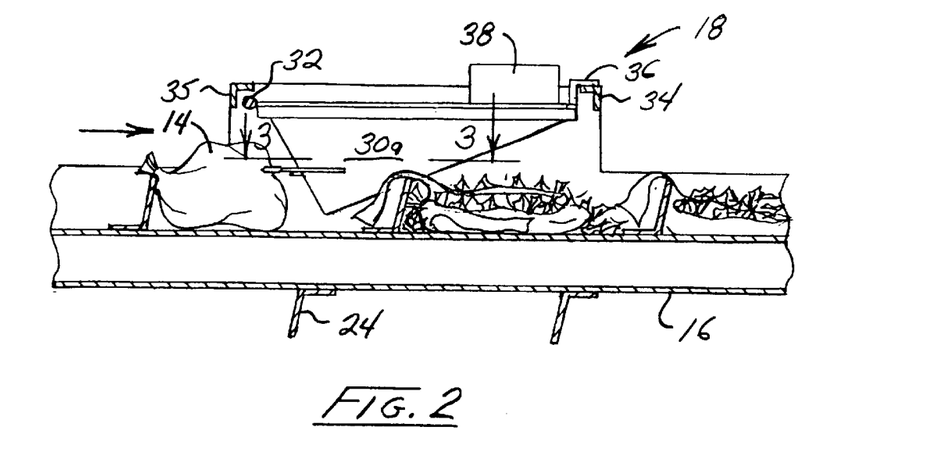
FIG. 2 is a cross-sectional view taken along line 2—2 of FIG. 1.

Splitting zone 18 has extended sidewalls 28a and 28b which confine the bags onto conveyor 16. In fact, sidewalls 29a and 29b conveniently are mounted along the entire extent of conveyor 16 for this containment purpose. Laterally spaced across the width of conveyor 16 are an overhead array of blade assemblies composed of blade holders 30a–30e and blades which will be described below. It will be appreciated that the number of blade assemblies can be greater or fewer in number with 5 assemblies chosen in the drawings for illustrative purposes only. Also, the assemblies could be stocked vertically also in order to accommodate stacked bags fed to such assemblies. Notching in, for example, flights 24 and 25 (and the other flights) accommodates the array of blade assemblies, actually blade holders (e.g., blade holders 30a–30e) that extend to just above the outer surface of conveyor 16.

Figure 3:
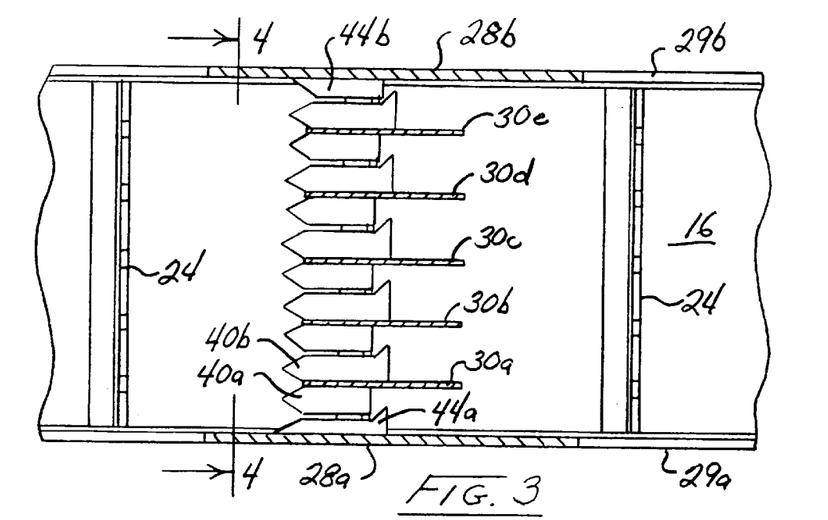
FIG. 3 is a cross-sectional view taken along line 3—3 of FIG. 2.

Each blade assembly (assembly 30a described for illustrative purposes) is pivotally mounted at its forward end (forward with respect to where bag 14 enters splitting zone 18) to pivot bar 32 and rests at its rearward end on rest bar 34 via angle 36. Weight 38 is added to blade holder 30a in order ensure that it does not pivot unless necessary, for example, due to a foreign object being conveyed by conveyor 16 in splitting zone 18 which could damage the blade assemblies. Rest bar 34 and bar 35 connect the upper corners of sidewalls 28a and 28b.

Figure 4:
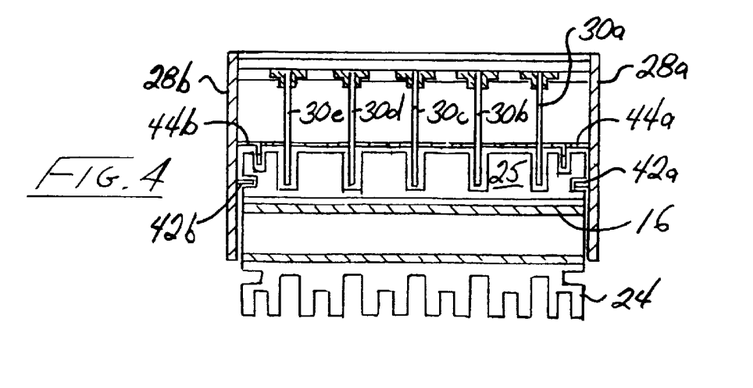
FIG. 4 is a cross-sectional view taken along line 4—4 of FIG. 3.

Each blade assembly carries horizontally-disposed, canard-like blades, e.g., canard blades 40a and 40b affixed to blade holder 30a. Additionally, sidewalls 28a and 28b also bear lower canard blades 42a and 42b, respectively, and upper canard blades 44a and 44b, respectively. Each canard blade has a forward point for slicing open the filled garbage bags. In FIG. 4, it will be observed that the canard blades are substantially continuously disposed laterally across splitting zone 18. The elongate structure of the canard blades is for strength and stability in mounting to their respective blade holders. The canard blades are configured and placed on their blade holders to slice open bags passed into splitting zone 18 while permitting the bags to stay together. Later separation of the split bags from their released contents is promoted if the bags are not sliced into separate pieces. Thus, the bags should be sliced open for release of their contents while the bag still remains together, i.e., one sliced piece of plastic.

Figure 5:
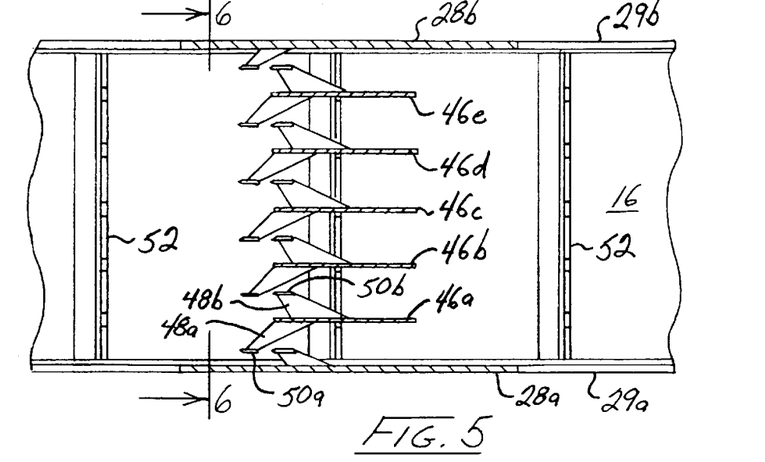
FIG. 5 is a cross-sectional view like that shown in FIG. 3, but for a blade design for opening bags filled with the cans and bottles fraction of MSW.
Figure 6:
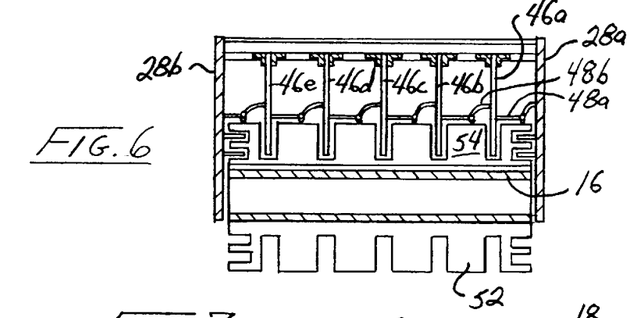
FIG. 6 is a cross-sectional view taken along line 6—6 of FIG. 5.
Figure 7:
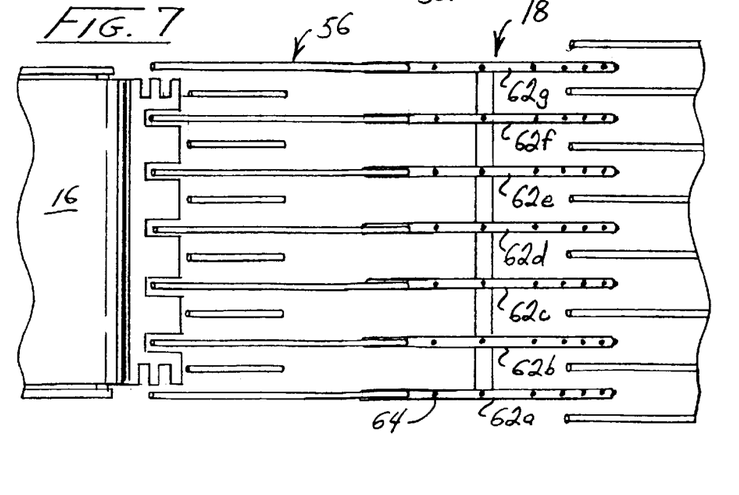
FIG. 7 is an overhead view of the separation and collection system for separating the bags from the contents therein.

For plastic bags filled with cans and bottles such as appear in curbside recycling programs, school recycling programs, industrial and commercial recycling employee programs, and similar programs, reference is made to FIGS. 5 and 6. It will be observed that blade holders 46a–46e retain blades, e.g., blade holder 46a retains blades 48a and 48b, which blade tips are terminated by pointed elongate elements 50a and 50b, respectively. These pencil-like elements are designed to puncture the bags followed by their slicing with the forward sharp edge of each blade. Moreover, one set of blades retained by each blade holder, e.g., blade 48a, is relatively flat and parallel to conveyor 16, while the other blade, e.g., blade 48b, is curvilinear in shape. Again, this configuration of blades is designed to cause continuous slices down the length of the filled bags while not shredding the bags into pieces. Also, sidewalls 28a and 28b also bear blades, with 3 in number being shown in FIG. 6. Flights 52 and 54 are notched where such blades intersect conveyor 16.

Referring back to FIG. 1 and to FIG. 7, the separation and collection aspects of the present invention will be described. Bar assembly 56 is seen to be located at the discharge end of conveyor 16 and is slanted downwardly therefrom. Bar assembly 56 is composed of a series of parallel bars whose spacing accommodates the contents that filled the bags fed to the splitting system. The split bags slide down bar assembly 56 for their later separation and collection. The spacing will be different when cans and bottles are in the bags than when yard waste is in the bags. Cans and bottles can contain plastic milk containers, for example, that require about a 6 inch spacing. Of course different length bars can be used in forming bar assembly 56, such as can be seen by reference to FIG. 7.

Disposed beneath bar assembly 56 is wheel array 58 which is formed from rotating axle 60 which has spoked wheels 62a–62g (a lesser or greater number of spoked wheels could be used) mounted thereto. The outer surface of each wheel bears nibs, e.g., nib 64 on wheel 62a, which catch the bags for their further emptying and separation from their contents. Such nibs conveniently can be weldments. What is required is the ability of the outer surface of the wheels to grab the split plastic garbage bags. A roughened outer surface of the wheels has been found to be appropriate for such grabbing purpose.

Disposed overhead of the bar assembly 56 and wheel array 58 is deflection plate 66 which is designed to deflect any material that bounces off of either bar assembly 56 or wheel array 58 so that such material will fall back for collection.

Disposed beneath the discharge side of wheel array 58 is bar assembly 68 on top of which the emptied bags will slide for their collection in container 22. Separated contents fall into container 20 for their collection.

Figure 8:
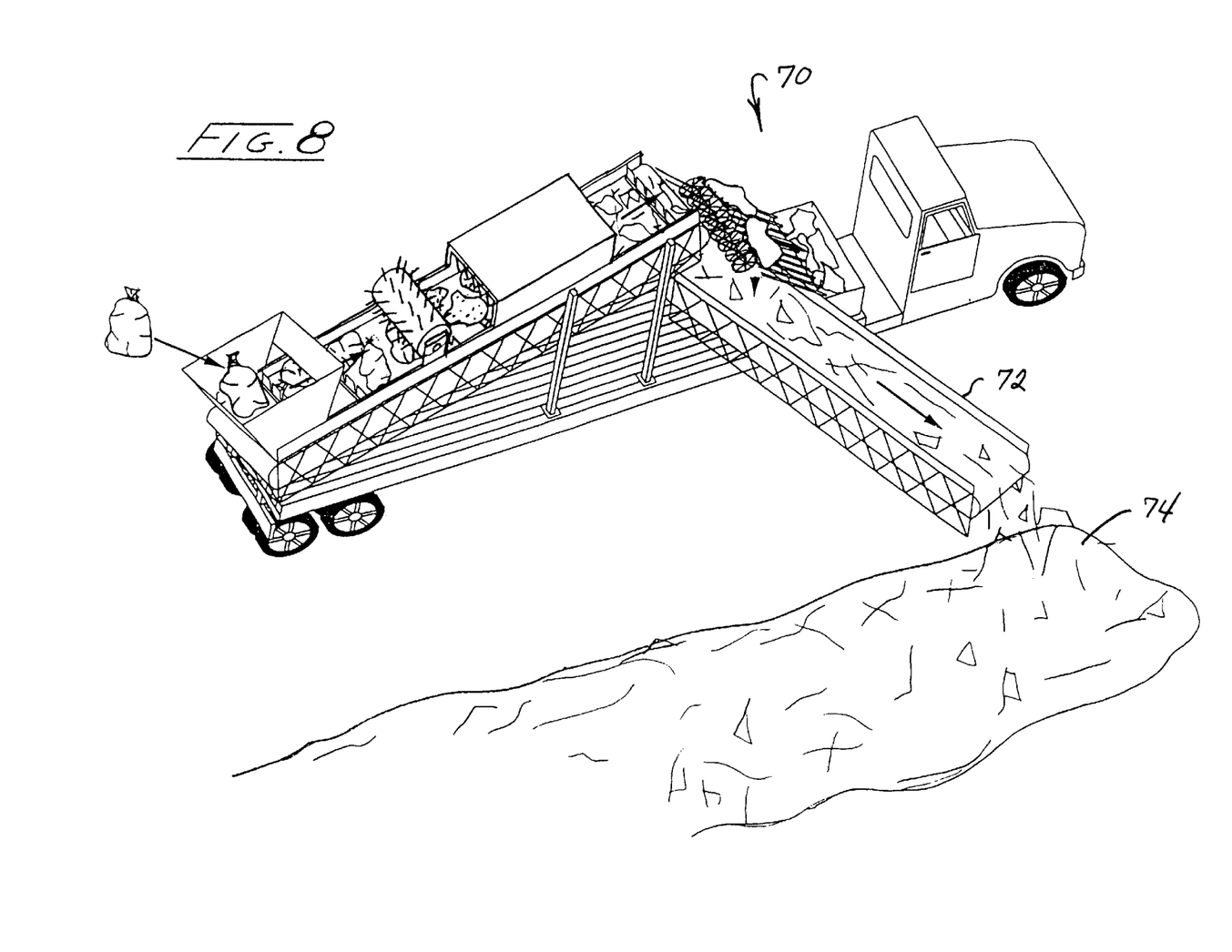
FIG. 8 is a perspective view of a mobile bag splitting system, bag separation system, and distribution system wherein yard waste is directly deposited in and forms windrows.

The released compostable yard waste can be collected, for example, for composting, refuse derived fuel (RDF) production, butanol product, or the like. In this regard, it is possible to collect the released yard waste on a conveyer for feeding a composting system which can be an aerated container or even a windrow. In fact, the entire assembly can mounted on a flatbed or other moveable conveyance and the released yard waste deposited to form windrows, such as is depicted in FIG. 8, where tractor-trailer 70 is seen to have a flatbed trailer upon which is mounted bag splitter 10 and separation 12, as described above. In this case, however, container 20 has been replaced with conveyor 72 conveys the separated yard waste onto, e.g., windrow 74 for its composting. Tractor-trailer 70 moves along a path designed to form windrow 74 (and other windrows) directly. Alternatively, the separated yard waste could be conveyed into another conveyor system, truck, or the like which would then form windrow 74.

Figure 9:
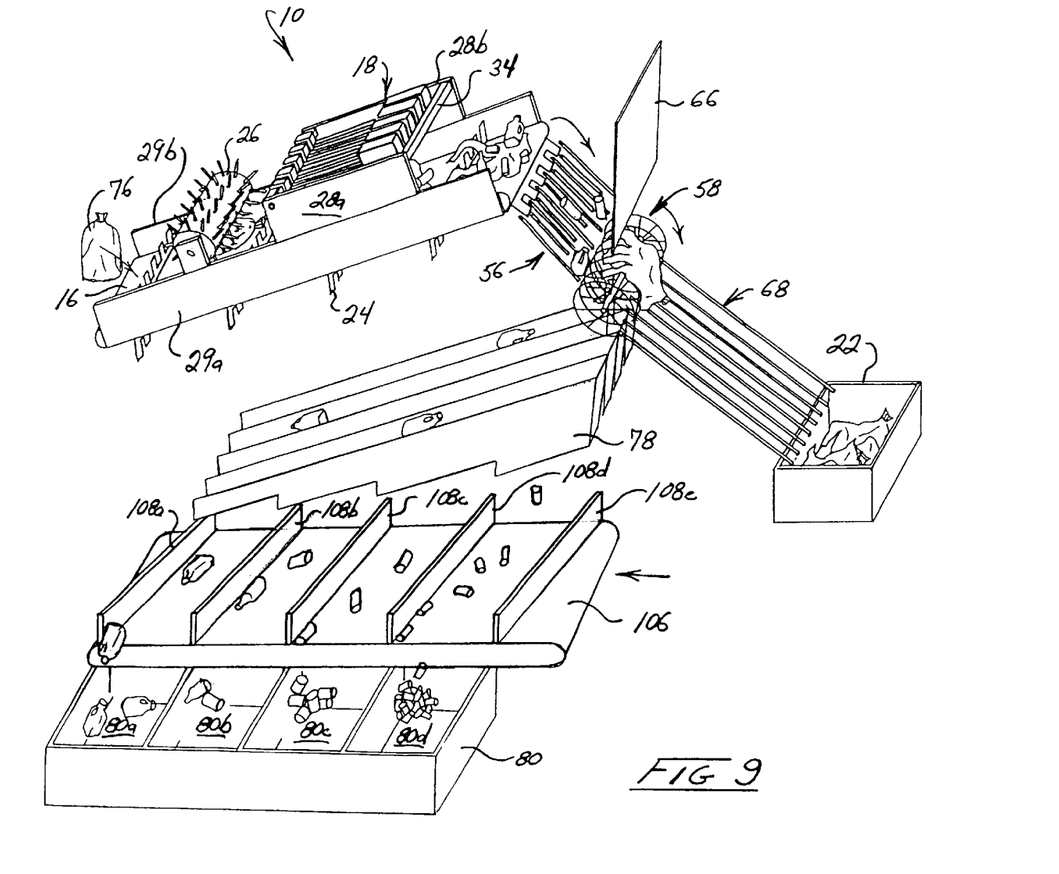
FIG. 9 is a perspective view of the bag splitting system, bag separation, system, and collection system for handling bags filled with bottles and cans.

With respect to handling bags whose contents comprise bottles and cans, reference is made to FIG. 9 whereat bag 76 containing bottles and cans, such as are collected in blue bag communities, is placed on flighted conveyor 16 and processed as described above. When the opened bags and their contents land on bar screen 56, cans and bottles smaller than the effective spacing between the bars will fall through and onto sluiceway system 78. Of course, ferrous cans can be removed at the exiting mouth of bag splitting assembly 10 by a suitably designed magnet, such as one placed overhead and which would convey ferrous materials away from bag splitting assembly 10 for their separate collection.

Figure 10:
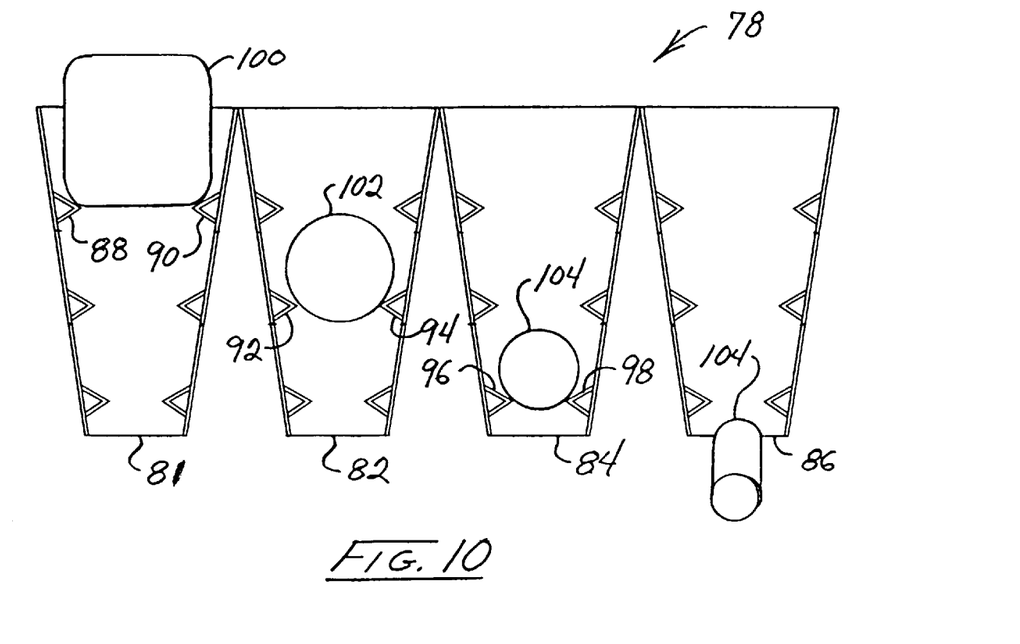
FIG. 10 is a cross-sectional view of the bottle and can separation system depicted in FIG. 9.

Larger sized bottles and cans may strike deflecting plate 66 and/or wheel array 58 and fall onto sluiceway system 78 which is shown in more detail in FIG. 10. Each sluiceway 80–86 is trapezoidal in cross-section and is fitted with a series of angle iron pairs, for example, angle iron 88 and 90 in sluiceway 81, from its upper end to its lower end. Each pair of angle irons is spaced closer together from top to bottom of each sluiceway. The length of each angle pair is adjusted to terminate over the desired bin into which the item is to be collected. In this manner, large container 100 (e.g., milk, wine, anti-freeze, etc.) slides down sluiceway 81 on angle iron pair 88/90 and onto conveyor 106 (see FIG. 9). A second fraction (e.g., PET container 102) slides down sluiceway 82 on angle iron pair 92/94 and drops onto conveyor 106 (see FIG. 9). A third fraction (e.g., aluminum can 104) slides down sluiceway 84 on angle iron pair 96/98 and drops onto conveyor 106 (see FIG. 9). Finally, a fourth fraction (e.g., small plastic item 104) falls through sluiceway 86 and directly onto conveyor 106 (see FIG. 9). Now, it will be appreciated that the number of angle iron pairs can be greater or lesser than the number shown in FIG. 10 depending upon the number of fractions desired to be collected. Moreover, other size separation systems could be used to advantage with the novel bag splitting apparatus disclosed herein.

Referring to FIG. 9, conveyor 106 is disposed beneath sluiceway system 78 and is fitted with fixed walls 108a–e which run diagonally across the top of conveyor 106. Each pair of walls (walls 108a and 108b, 108b and 108c, 108c and 108d, and 108d and 108e) are arranged so that the fraction of material passing through sluiceway system 78 and onto conveyor 106 is directed into a corresponding bin sections (bin sections 80a–80d) of bin 80 for its collection. Conveyor 106 ensures that the material will be directed into each corresponding bin and serves to accumulate the distribute the material evenly thereacross.

From bin 80, each separated fraction collected as is or further separated, e.g., by color of container, by composition (e.g., metal, plastic) of container, etc. Each fraction, or sub-fraction thereof, can be sent for recycling and/or reuse depending on its composition, the make-up of the fraction, and other factors known to those in this field.

Materials of construction will be appropriate for the rugged environment in which the inventive bag splitter and separator assemblies will be used. Thus, steel construction will be preferred with corrosion protecting coatings, stainless steel, etc. used where necessary or appropriate. The same is true of composites and plastics which ordinarily will only be used where less rugged conditions are expected to exist.

Other modifications and changes can be made to the invention disclosed herein in accordance with the disclosure and precepts herein and without departing from the spirit of the invention.

What is claimed is:

1. An assembly for splitting open contents-filled garbage bags selected from bags filled with yard waste and bags filled with cans and bottles, which comprises:
   (a) a flighted conveyor that conveys contents filled garbage bags into a confined bag splitter assembly;
   (b) said bag splitter assembly having sidewalls to confine filled garbage bags therein and having an overhead array of blade assemblies laterally spaced across the conveyor for confronting filled garbage bags conveyed by said conveyor into said bag splitter assembly, said blade assemblies comprising a pivotally mounted blade holder disposed above said conveyor and carrying horizontally-disposed canard-like blades having a forward point for confronting said filled garbage bags, said blades disposed substantially continuously laterally across the width of said bag splitter assembly.

2. The assembly of claim 1, wherein said flighted conveyor is inclined upwardly in the direction of movement of the conveyor.

3. The assembly of claim 1, wherein said conveyor flights are inclined forward in the direction of movement of said conveyor.

4. The assembly of claim 1, wherein a spiked drum is mounted ahead of said bag splitter assembly and is spaced above said flighted conveyor for puncturing holes in said filled bags to release any air pressure therein, said drum mounted for rotation only in the direction of said flighted conveyor.

5. The assembly of claim 1, wherein the rotation of each of said blade holders is pivoted at its rearward end and its pivoting is limited by a stop.

6. The assembly of claim 5, wherein said blade assemblies rearward end rest upon a rest bar and bear a blade weight positioned to further bias said blade assemblies against said rest bar.

7. The assembly of claim 1, wherein the conveyor flights are notched to accommodate said blade holders.

8. The assembly of claim 1, wherein for bags filled with cans and bottles, said canard-like blades forward tip carry pointed elongate elements for puncturing said bags.

9. The assembly of claim 1, wherein said sidewalls carry horizontally-disposed canard-like blades.

10. The assembly of claim 1, which is fitted with a separation assembly for separating the garbage bag contents from the split bags, which comprises:
    (a) the discharge end of said conveyor being fitted with a first downward-sloping parallel bar assembly for permitting contents from said split bags to fall therethrough and for split bags to slide down said bar assembly and onto a rotating wheel array;
    (b) said rotating wheel array having a rotating axle from which a plurality of spoked wheels are parallelly mounted, the outer circumference of said wheels bearing nibs for catching said split bags and urging their separation from the bag contents.

11. The assembly of claim 10, wherein a deflection plate is mounted overhead of said separation assembly to contain any material that might bounce up in the air.

12. The assembly of claim 10, wherein a second downward-sloping parallel bar assembly follows said rotating wheel array for conveying empty split bags from said wheel array for their collection.

13. The assembly of claim 10, wherein disposed beneath said separation assembly is a set of downwardly sloping sluiceways whose interiors are trapezoidal in cross-section and which are fitted with pairs of angle irons on their interior, the length of the pairs of angle irons being different for separating said bag contents by contents size.

14. An assembly for splitting open cans and bottles-filled garbage bags, which comprises:
    (a) a flighted conveyor inclined upward in its direction of movement that conveys the filled garbage bags into a confined bag splitter assembly, said flights being inclined forward;
    (b) said bag splitter assembly having sidewalls to confine filled garbage bags therein and having an overhead array of blade assemblies laterally spaced across the conveyor for confronting filled garbage bags conveyed by said conveyor into said bag splitter assembly, said blade assemblies comprising a pivotally mounted blade holder disposed above said conveyor and carrying horizontally-disposed canard-like blades having a forward tip carry pointed elongate elements for puncturing said bags, said blades disposed substantially continuously laterally across the width of said bag splitter assembly, said sidewalls also carrying horizontally-disposed canard-like blades.

15. The assembly of claim 14, wherein the rotation of each of said blade holders is pivoted at its forward end and its pivoting is limited by a stop.

16. The assembly of claim 15, wherein said blade assemblies rearward end rest upon a rest bar and bear a blade weight positioned to further bias said blade assemblies against said rest bar.

17. An assembly for splitting open yard waste-filled garbage bags, which comprises:
    (a) a flighted conveyor inclined upward in its direction of movement that conveys the filled garbage bags into a confined bag splitter assembly, said flights being inclined forward;
    (b) said bag splitter assembly having sidewalls to confine filled garbage bags therein and having an overhead array of blade assemblies laterally spaced across the conveyor for confronting filled garbage bags conveyed by said conveyor into said bag splitter assembly, said blade assemblies comprising a pivotally mounted blade holder disposed above said conveyor and carrying horizontally-disposed canard-like blades having a forward point for slicing said bags, said blades disposed substantially continuously laterally across the width of said bag splitter assembly, said sidewalls also carrying horizontally-disposed canard-like blades.

18. The assembly of claim 17, wherein the rotation of each of said blade holders is pivoted at its forward end and its pivoting is limited by a stop.

19. The assembly of claim 18, wherein said blade assemblies rearward end rest upon a rest bar and bear a blade weight positioned to further bias said blade assemblies against said rest bar.

20. A method for splitting open contents-filled garbage bags selected from bags filled with yard waste and bags filled with cans and bottles, which comprises:
    (a) conveying contents filled garbage bags on a flighted conveyor into a confined bag splitter assembly, said bag splitter assembly having sidewalls to confine filled garbage bags therein and having an overhead array of blade assemblies laterally spaced across the conveyor for confronting filled garbage bags conveyed by said conveyor into said bag splitter assembly, said blade assemblies comprising a pivotally mounted blade holder disposed above said conveyor and carrying horizontally-disposed canard-like blades having a forward point for confronting said filled garbage bags, said blades disposed substantially continuously laterally across the width of said bag splitter assembly; and (b) withdrawing split bags and said contents from said bag splitter assembly.

21. The method of claim 20, wherein holes are punctured in said filled bags to release any air pressure therein by passing said bags into contact with a spiked drum which is mounted ahead of said bag splitter assembly and is spaced above said flighted conveyor for, said drum mounted for rotation only in the direction of said flighted conveyor.

22. The method of claim 20, wherein said bag splitter assembly for separating the garbage bag contents from the split bags is provided by fitting the discharge end of said conveyor with a first downward-sloping parallel bar assembly for permitting contents from said split bags to fall therethrough and for split bags to slide down said bar assembly and onto a rotating wheel array, said rotating wheel array having a rotating axle from which a plurality of spoked wheels are parallelly mounted, the outer circumference of said wheels bearing nibs for catching said split bags and urging their separation from the bag contents.

23. The method of claim 22, which further includes disposing beneath said separation assembly a set of downwardly sloping sluiceways whose interiors are trapezoidal in cross-section and which are fitted with pairs of angle irons on their interior, the length of the pairs of angle irons being different for separating said bag contents by contents size.

24. The method of claim 23, wherein disposed beneath said sluiceways is a conveyor having an upper surface and beneath said conveyor is disposed bins, wherein the upper surface of said conveyor is segmented by fixed diagonally disposed walls which walls direct any contents falling onto said conveyor into bins disposed therebeneath.

* * * * *